US008560832B2

(12) United States Patent
Nishikawa et al.

(10) Patent No.: US 8,560,832 B2
(45) Date of Patent: Oct. 15, 2013

(54) INFORMATION PROCESSING APPARATUS

(75) Inventors: Shigeru Nishikawa, Fujisawa (JP);
Akihiko Yushiya, Tokyo (JP)

(73) Assignee: Canon Kabushiki Kaisha (JP)

( * ) Notice: Subject to any disclaimer, the term of this patent is extended or adjusted under 35 U.S.C. 154(b) by 942 days.

(21) Appl. No.: 12/623,058

(22) Filed: Nov. 20, 2009

(65) Prior Publication Data
US 2010/0138648 A1    Jun. 3, 2010

(30) Foreign Application Priority Data

Nov. 27, 2008   (JP) .................................. 2008-302907
Sep. 14, 2009   (JP) .................................. 2009-212520

(51) Int. Cl.
*G06F 21/00*    (2013.01)

(52) U.S. Cl.
USPC ......................................................... 713/151

(58) Field of Classification Search
USPC ......................................................... 713/151
See application file for complete search history.

(56) References Cited

U.S. PATENT DOCUMENTS

| | | | | |
|---|---|---|---|---|
| 7,697,681 | B2* | 4/2010 | Leech | 380/28 |
| 7,831,039 | B2* | 11/2010 | Bertoni et al. | 380/28 |
| 7,856,102 | B2* | 12/2010 | Hatakeyama | 380/37 |
| 8,010,801 | B2* | 8/2011 | Qi et al. | 713/189 |
| 8,112,622 | B2* | 2/2012 | Qi | 713/153 |
| 2004/0017913 | A1* | 1/2004 | Hawkes et al. | 380/37 |
| 2004/0202317 | A1* | 10/2004 | Demjanenko et al. | 380/28 |
| 2005/0175175 | A1* | 8/2005 | Leech | 380/29 |
| 2006/0245588 | A1* | 11/2006 | Hatakeyama | 380/37 |
| 2007/0106896 | A1* | 5/2007 | Sandberg et al. | 713/170 |
| 2007/0189540 | A1* | 8/2007 | Tarkkala | 380/277 |
| 2007/0286415 | A1* | 12/2007 | Bertoni et al. | 380/37 |
| 2007/0286416 | A1* | 12/2007 | Bertoni et al. | 380/37 |
| 2008/0130894 | A1* | 6/2008 | Qj et al. | 380/277 |
| 2008/0141023 | A1* | 6/2008 | Qi | 713/155 |
| 2009/0214026 | A1* | 8/2009 | Gueron et al. | 380/29 |

FOREIGN PATENT DOCUMENTS

JP    2005-148894 A    6/2005

* cited by examiner

*Primary Examiner* — Oscar Louie
(74) *Attorney, Agent, or Firm* — Rossi, Kimms & McDowell LLP

(57) ABSTRACT

To efficiently perform encryption/decryption and message authentication processing for a plurality of messages in parallel, an information processing apparatus includes a plurality of encryption/decryption and message authentication units which can perform encryption/decryption processing and message authentication processing by switching between them in a predetermined block unit, and are configured to be operable in parallel, and a data transfer control unit which distributes processing target data associated with an encryption/decryption and message authentication processing request to the plurality of encryption/decryption and message authentication units. The data transfer control unit distributes the processing target data so that each of the plurality of encryption/decryption and message authentication units alternately performs the encryption/decryption processing and the message authentication processing in the predetermined block unit for each processing request included in a plurality of processing requests.

5 Claims, 10 Drawing Sheets

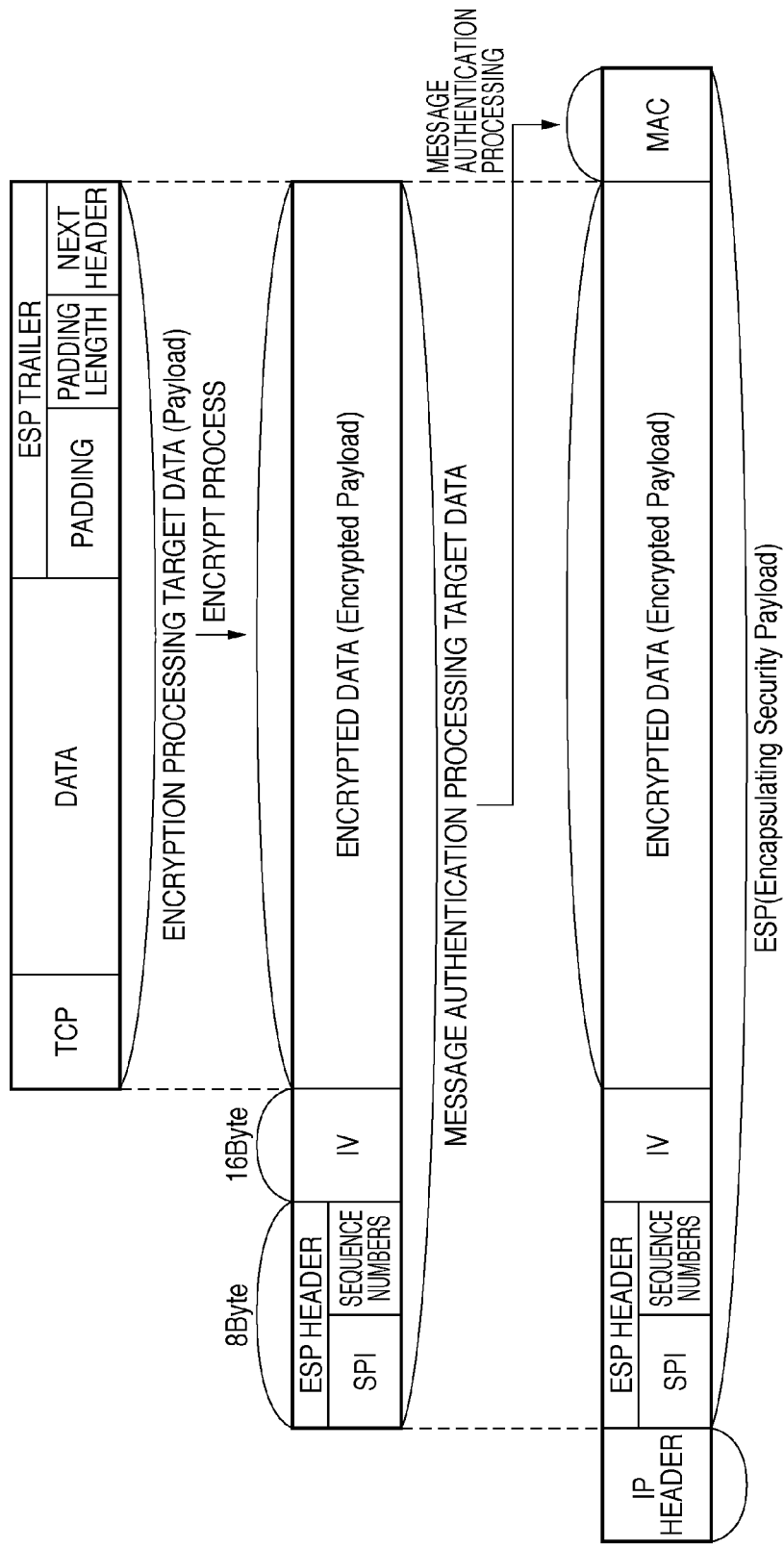

INFORMATION PROCESSING APPARATUS

BACKGROUND OF THE INVENTION

1. Field of the Invention

The present invention relates to an information processing apparatus which adopts an AES (Advanced Encryption Standard) algorithm for both encryption/decryption processing and message authentication processing.

2. Description of the Related Art

These days, large-capacity communication via the Internet is prevalent. Along with this trend, to ensure communication security, digital data is encrypted by a predetermined algorithm, and at the same time undergoes message authentication processing by a predetermined algorithm so as to detect tampering in the process of communication. IPSEC (IP Security) as one protocol to attain secure communication has recently adopted AES-based AES-XCBC-MAC-96 as a message authentication algorithm. AES-XCBC-MAC-96 is characterized by high processing speed and high security.

A hash function called MD5 or SHA-1 has been conventionally used to generate a MAC (Message Authentication Code) value for message authentication. MD5 and SHA-1 process input data for each 64-byte block. However, these hash functions cannot achieve high-speed processing because they use a block length as long as 64 bytes. In addition, security vulnerability attributed to the use of a MAC value of 160 bits has begun to be pointed out.

A case in which parallel IPSEC protocol processing is necessary for a plurality of messages will be considered herein. In this case, it is a common practice to use only one resource for each of encryption/decryption processing and message authentication processing in IPSEC, therefore efficient parallel processing is naturally difficult. That is, to process one message, temporarily suspend its processing, process the other message, and resume processing of the first message, software control for suspending and resuming encryption/decryption processing and message authentication processing is necessary in that case.

Under the circumstance, Japanese Patent Laid-Open No. 2005-148894 (patent reference 1), for example, discloses a technique of, when the ranges of encryption/decryption processing and message authentication processing are different from each other, performing parallel processing upon transferring the identical data at once.

Unfortunately, to process a plurality of messages in parallel, the technique described in patent reference 1 mentioned above requires switching between the input data and output data to and from an encryption/decryption processing unit and a message authentication processing unit under software control, and suspending and resuming processing of each message. This poses a problem of large processing overheads inevitably imposed on these processing units by software control.

Also, when a combination of, for example, AES-CBC as an encryption/decryption algorithm which uses a block length of 16 bytes and SHA-1 as a message authentication processing algorithm which uses a block length of 64 bytes in IPSEC is employed, the following problem is posed. That is, one processing unit needs to transfer data to the other processing unit at the timing for processing (message authentication processing in this case) having a relatively large minimum unit of processing. This is because encryption/decryption processing and message authentication processing have dependencies between them in IPSEC; the latter processing follows the former processing. In view of this, even if encryption/decryption processing and message authentication processing are simply performed in parallel via a pipeline, their parallel operation has limited speedup as compared with a case in which the same unit of processing is used.

SUMMARY OF THE INVENTION

According to one aspect of the present invention, an information processing apparatus comprises: a plurality of encryption/decryption and message authentication units which are configured to perform both AES-CBC encryption/decryption processing and AES-XCBC-MAC-96 message authentication processing, and to be operable in parallel; and a data transfer control unit which distributes processing target data associated with an encryption/decryption and message authentication processing request to the plurality of encryption/decryption and message authentication units, wherein the data transfer control unit distributes the processing target data so that one of the plurality of encryption/decryption and message authentication units performs the encryption/decryption processing and at least one of the remainder of the plurality of encryption/decryption and message authentication units performs the message authentication processing for one processing request.

According to another aspect of the present invention, an information processing apparatus comprises: a plurality of encryption/decryption and message authentication units which are configured to perform AES-CBC encryption/decryption processing and AES-XCBC-MAC-96 message authentication processing by switching therebetween in a predetermined block unit, and to be operable in parallel; and a data transfer control unit which distributes processing target data associated with an encryption/decryption and message authentication processing request to the plurality of encryption/decryption and message authentication units, wherein the data transfer control unit distributes the processing target data so that each of the plurality of encryption/decryption and message authentication units alternately performs the encryption/decryption processing and the message authentication processing in the predetermined block unit for each processing request included in a plurality of processing requests.

According to still another aspect of the present invention, an information processing apparatus comprises: a plurality of encryption/decryption and message authentication units which are configured to perform AES-CBC encryption/decryption processing and AES-XCBC-MAC-96 message authentication processing by switching therebetween in a predetermined block unit, and to be operable in parallel; a data transfer control unit which distributes processing target data associated with an encryption/decryption and message authentication processing request to the plurality of encryption/decryption and message authentication units; and a switching unit which switches an operation mode of the data transfer control unit in accordance with a circumstance in which the processing request arises, wherein the data transfer control unit has two modes: a first operation mode in which the data transfer control unit distributes the processing target data so that one of the plurality of encryption/decryption and message authentication units performs the encryption/decryption processing and at least one of the remainder of the plurality of encryption/decryption and message authentication units performs the message authentication processing, and a second operation mode in which the data transfer control unit distributes the processing target data so that each of the plurality of encryption/decryption and message authentication units alternately performs the encryption/decryption processing and the message authentication processing in the predetermined block unit.

According to yet another aspect of the present invention, an information processing apparatus comprises: an encryption/decryption unit which performs AES-CBC encryption processing, and a message authentication unit which performs AES-XCBC-MAC-96 message authentication processing, the encryption/decryption unit and the message authentication unit being configured to be operable in parallel; a data transfer control unit which distributes processing target data associated with an encryption/decryption and message authentication processing request to one of the encryption/decryption unit and the message authentication unit, wherein the data transfer control unit distributes the processing target data so as to alternately perform the encryption/decryption processing by the encryption/decryption unit and the message authentication processing by the message authentication unit in a predetermined block unit for each processing request included in a plurality of processing requests.

The present invention achieves speedup of encryption/decryption processing and message authentication processing in IPSEC when they are performed for a plurality of messages in parallel.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a view illustrating an example of the packet format of an IPSEC ESP in IPv4 transport mode;

DESCRIPTION OF THE EMBODIMENTS

Figure 1A:
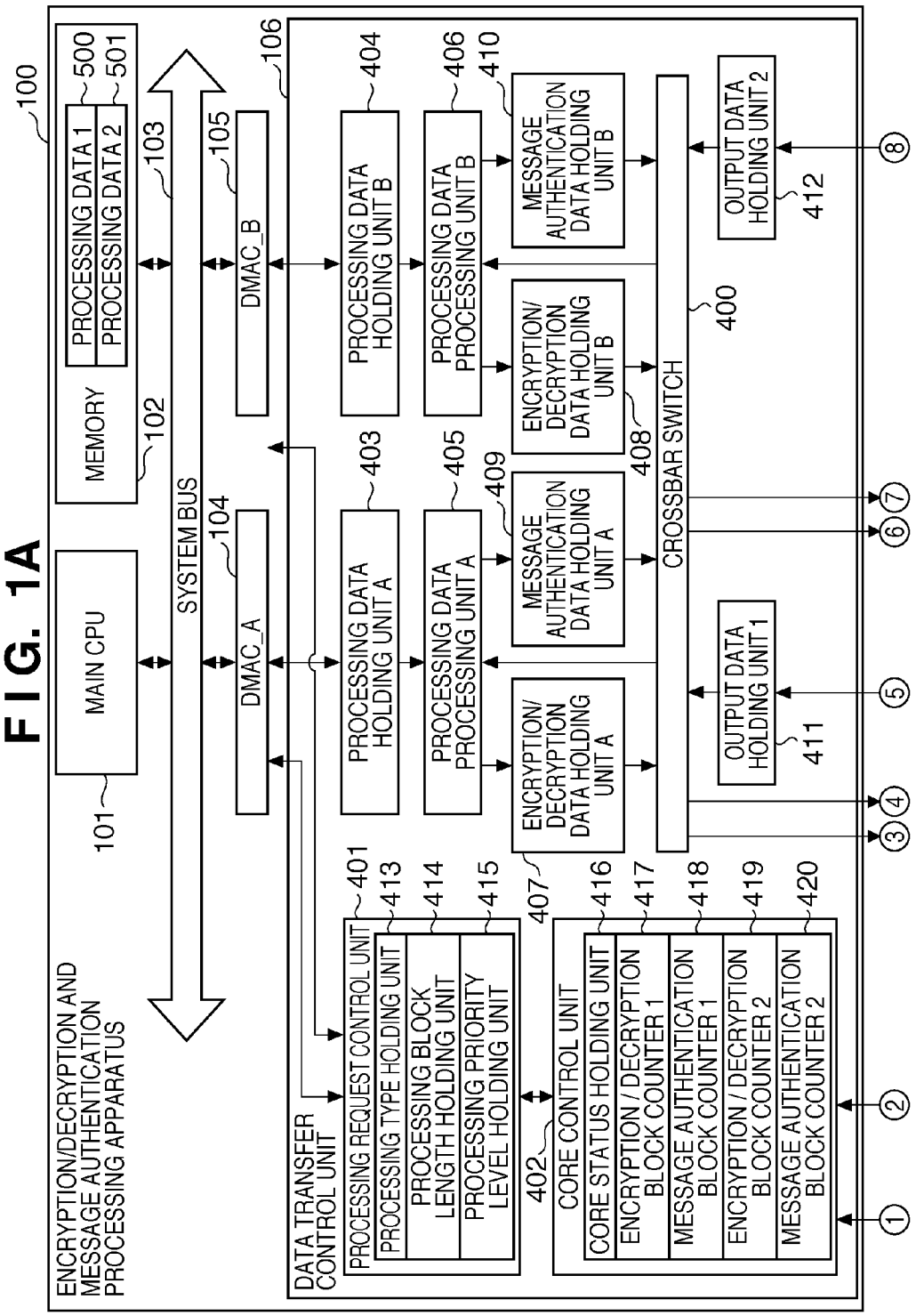
FIGS. 1A and 1B are a block diagram showing the arrangement of an encryption/decryption processing apparatus according to the first embodiment of the present invention.

Preferred embodiments of the present invention will be described in detail below with reference to the accompanying drawings. Note that the arrangements shown in the following embodiments are merely examples, and the present invention is not limited to the arrangements shown in the drawings. Note also that "encryption/decryption processing" means both an encrypt process and decrypt process using a predetermined encryption/decryption algorithm, and "authentication processing" means a generation process of a message authentication code using a predetermined message authentication algorithm.

<First Embodiment>

In the first embodiment, since IPSEC is used as a secure communication protocol, an ESP (Encapsulating Security Payload) is exploited as a data transfer protocol. The first embodiment will particularly exemplify a case in which an AES encryption/decryption and message authentication core which can perform both encryption/decryption processing that uses AES-CBC as an encryption/decryption algorithm and message authentication processing that uses AES-XCBC-MAC-96 as a message authentication algorithm (to be simply referred to as "encryption/decryption and message authentication processing" hereinafter) is used. The first embodiment will also exemplify a case in which two AES encryption/decryption and message authentication cores which have the same arrangement and are configured to be operable in parallel are used.

Apparatus Arrangement

Figure 1B:
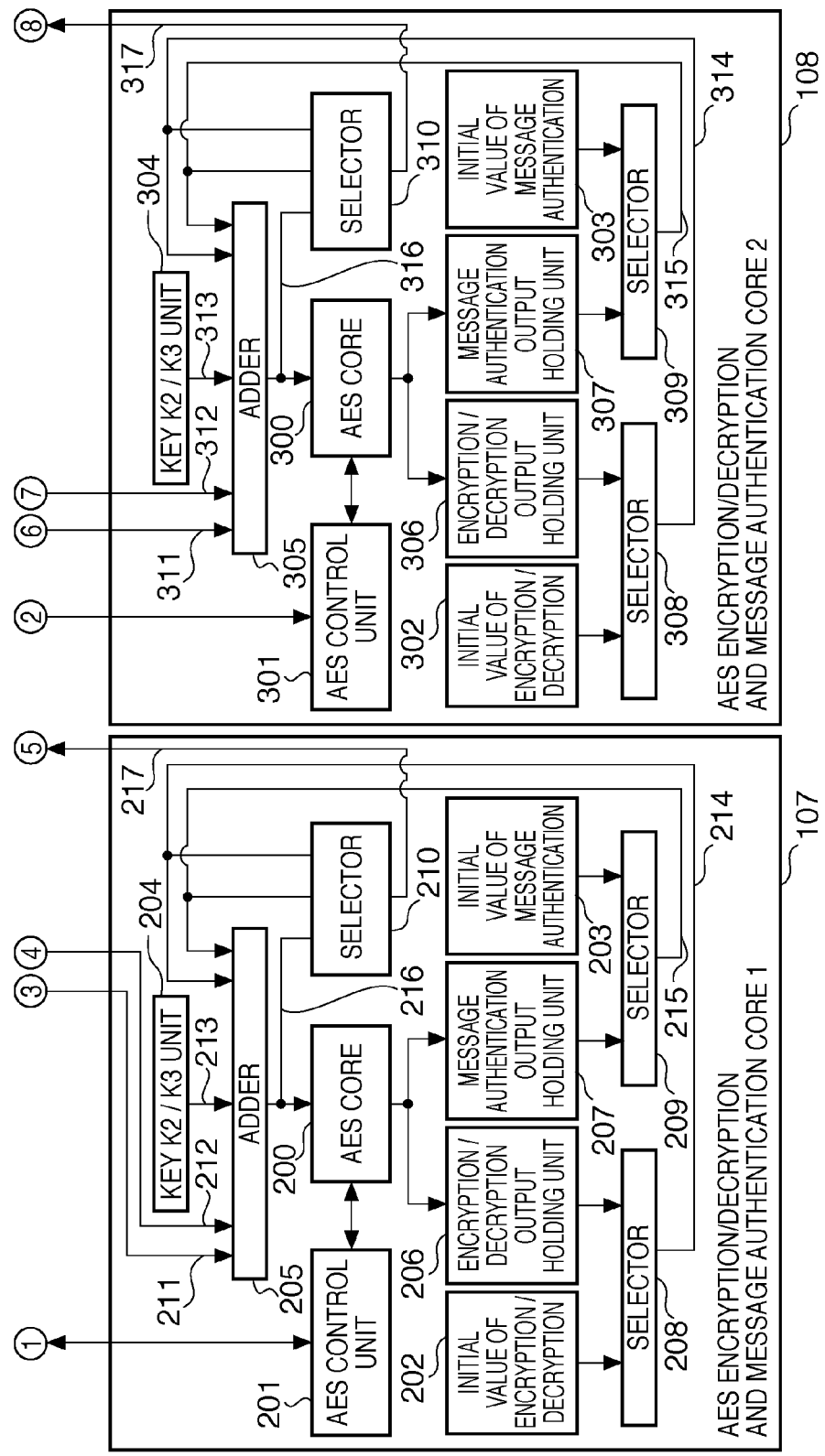

FIGS. 1A and 1B are a block diagram showing the arrangement of an encryption/decryption processing apparatus serving as an information processing apparatus according to the first embodiment. Referring to FIGS. 1A and 1B, reference numeral 100 denotes an encryption/decryption processing apparatus which implements IPSEC. FIGS. 1A and 1B show only constituent components associated with encryption/decryption and message authentication processing especially during data transfer.

In the encryption/decryption processing apparatus 100, reference numeral 101 denotes a main CPU which controls the overall apparatus; and 102, a memory which functions as a main storage unit for the main CPU 101. Reference numeral 103 denotes a system bus for, e.g., data signals, address signals, and control signals. Reference numerals 104 and 105 denote DMA controllers (DMAC_A and DMAC_B) which transfer data between the memory 102 and a data transfer control unit 106 (to be described later).

Reference numerals 107 and 108 denote AES encryption/decryption and message authentication cores 1 and 2 which function as processing units for processing based on AES-CBC or AES-XCBC-MAC-96 and will be simply referred to as the encryption/decryption and message authentication cores 107 and 108 hereinafter. Reference numeral 106 denotes the data transfer control unit which implements data transfer under a predetermined connection condition between the DMAC_A 104, DMAC_B 105, and encryption/decryption and message authentication cores 107 and 108.

The detailed arrangements of the encryption/decryption and message authentication cores 107 and 108 will be explained below. Note that the encryption/decryption and message authentication cores 107 and 108 have basically the same arrangement, and the encryption/decryption and message authentication core 107 will be particularly explained herein. That is, in FIGS. 1A and 1B, internal components of the encryption/decryption and message authentication core 107 which are denoted by reference numerals with an MSD of "2" are identical to those of the encryption/decryption and message authentication core 108 which are denoted by reference numerals with an MSD of "3".

In the encryption/decryption and message authentication core 107, reference numeral 200 denotes an AES core which performs block encoding processing for input data corresponding to one 16-byte (128-bit) AES block. Reference numeral 201 denotes an AES control unit 201 which systematically controls the encryption/decryption and message authentication core 107. Reference numeral 202 denotes the initial value of the encryption/decryption, which stores the initial vector of AES-CBC; and 203, the initial value of the message authentication, which stores the initial vector of AES-XCBC-MAC-96. Reference numeral 204 denotes a key K2/K3 unit which selectively adds a key K2 or K3 to the data involved, in accordance with whether the message length is a multiple of the block length in processing of the last block of AES-XCBC-MAC-96; and 205, an adder which functions to calculate the exclusive OR of 5 inputs.

Reference numeral 206 denotes an encryption/decryption output holding unit which holds the encryption/decryption output data from the AES core 200; and 207, a message authentication output holding unit which holds the message authentication output data from the AES core 200. Reference numeral 208 denotes a selector for switching between the initial value of the encryption/decryption 202 and the encryption/decryption output holding unit 206 in accordance with the block number; and 209, a selector for switching between the initial value of the message authentication 203 and the message authentication output holding unit 207 in accordance with the block number.

Reference numeral 210 denotes a selector for selectively switching between the outputs from the adder 205, selector 208, and selector 209. Reference numeral 211 denotes an encryption/decryption processing input which is used to input an encryption/decryption processing message, output from the data transfer control unit 106, to the encryption/decryption and message authentication core 107. Reference numeral 212 denotes a message authentication processing input which is used to input a message authentication processing message, output from the data transfer control unit 106, to the encryption/decryption and message authentication core 107. Reference numeral 213 denotes the output from the key K2/K3 unit 204; 214, the output from the selector 208; 215, the output from the selector 209; 216, the output from the adder 205; and 217, the output from the selector 210.

The detailed arrangement of the data transfer control unit 106 will be explained below.

In the data transfer control unit 106, reference numeral 400 denotes a crossbar switch which forms the connection route for data transfer among the DMAC_A 104, the DMAC_B 105, and the encryption/decryption and message authentication cores 107 and 108. Reference numeral 401 denotes a processing request control unit which controls an encryption/decryption and message authentication processing request for the message transferred from the DMAC_A 104 and DMAC_B 105. Reference numeral 402 denotes a core control unit which monitors the processing statuses of the encryption/decryption and message authentication cores 107 and 108.

Reference numerals 403 and 404 denote processing data holding units A and B which hold the data transferred from the DMAC_A 104 and DMAC_B 105, respectively. Reference numerals 405 and 406 denote processing data processing units A and B which form encryption processing target data (data to be encrypted) and message authentication processing target data (data whose message is to be authenticated) from the data transferred from the DMAC_A 104, DMAC_B 105, and encryption/decryption and message authentication cores 107 and 108. One method of this data formation extracts data in a range necessary for encryption/decryption and message authentication from the transferred data, and inserts additional data into the extracted data as needed, thereby forming encryption processing target data and message authentication processing target data. Reference numerals 407 and 408 denote encryption/decryption data holding units A and B which hold the encryption processing target data formed from the data transferred from the DMAC_A 104 and DMAC_B 105, respectively. Reference numerals 409 and 410 denote message authentication data holding units A and B which hold the message authentication processing target data formed from the data transferred from the DMAC_A 104 and DMAC_B 105, respectively.

Reference numerals 411 and 412 denote output data holding units 1 and 2 which hold the data output from the encryption/decryption and message authentication cores 107 and 108, respectively, and will be simply referred to as the output data holding units 411 and 412 hereinafter.

The detailed arrangement of the processing request control unit 401 will be explained below.

Reference numeral 413 denotes a processing type holding unit which holds the types of processing requests, such as encryption/decryption and message authentication processing in IPSEC. Reference numeral 414 denotes a processing block length holding unit which holds the processing block lengths of encryption/decryption and message authentication processing associated with the processing requests held in the processing type holding unit 413. Reference numeral 415 denotes a processing priority level holding unit which holds the priority levels of processing corresponding to the respective processing requests.

The detailed arrangement of the core control unit 402 will be explained below.

Reference numeral 416 denotes a core status holding unit which holds the operation status of each encryption/decryption and message authentication core connected to it. Reference numerals 417 and 419 denote encryption/decryption block counters 1 and 2 which count the numbers of processing blocks of encryption/decryption processing in the encryption/decryption and message authentication cores 107 and 108, respectively. Reference numerals 418 and 420 denote message authentication block counters 1 and 2 which count the numbers of processing blocks of message authentication processing in the encryption/decryption and message authentication cores 107 and 108, respectively.

Also, the memory 102 stores processing data 1 and 2 for use in processing requests 1 and 2 as processing data 500 and 501, respectively.

Packet Format

FIG. 2 illustrates an example of the packet format of an IPSEC ESP in IPv4 transport mode. Referring to FIG. 2, "Payload" as encryption processing target data (data to be encrypted) contains a TCP header, data (communication contents), and an ESP trailer. The ESP trailer contains padding data with an arbitrary length, the padding length, and the next header.

Also, message authentication processing target data (data whose message is to be authenticated) contains an ESP header, the IV (Initial Vector) of an encryption/decryption algorithm, and encrypted data obtained by encrypting (encoding) the above-mentioned encryption processing target data. The ESP header contains a 4-byte SPI (Security Pointer Index) and 4-byte sequence numbers.

The ESP contains the above-mentioned message authentication processing target data, and the MAC value calculated from the message authentication processing target data. Furthermore, the ESP is added with an IP header and transmitted to the communication partner.

Pipeline Operation Which Fixedly Uses Each Core (First Operation Mode)

The encryption/decryption processing apparatus according to the first embodiment realizes a pipeline operation for one IPSEC processing request by fixedly using one of the encryption/decryption and message authentication cores 107 and 108 for encryption/decryption, and using the other one for message authentication.

Figure 3:
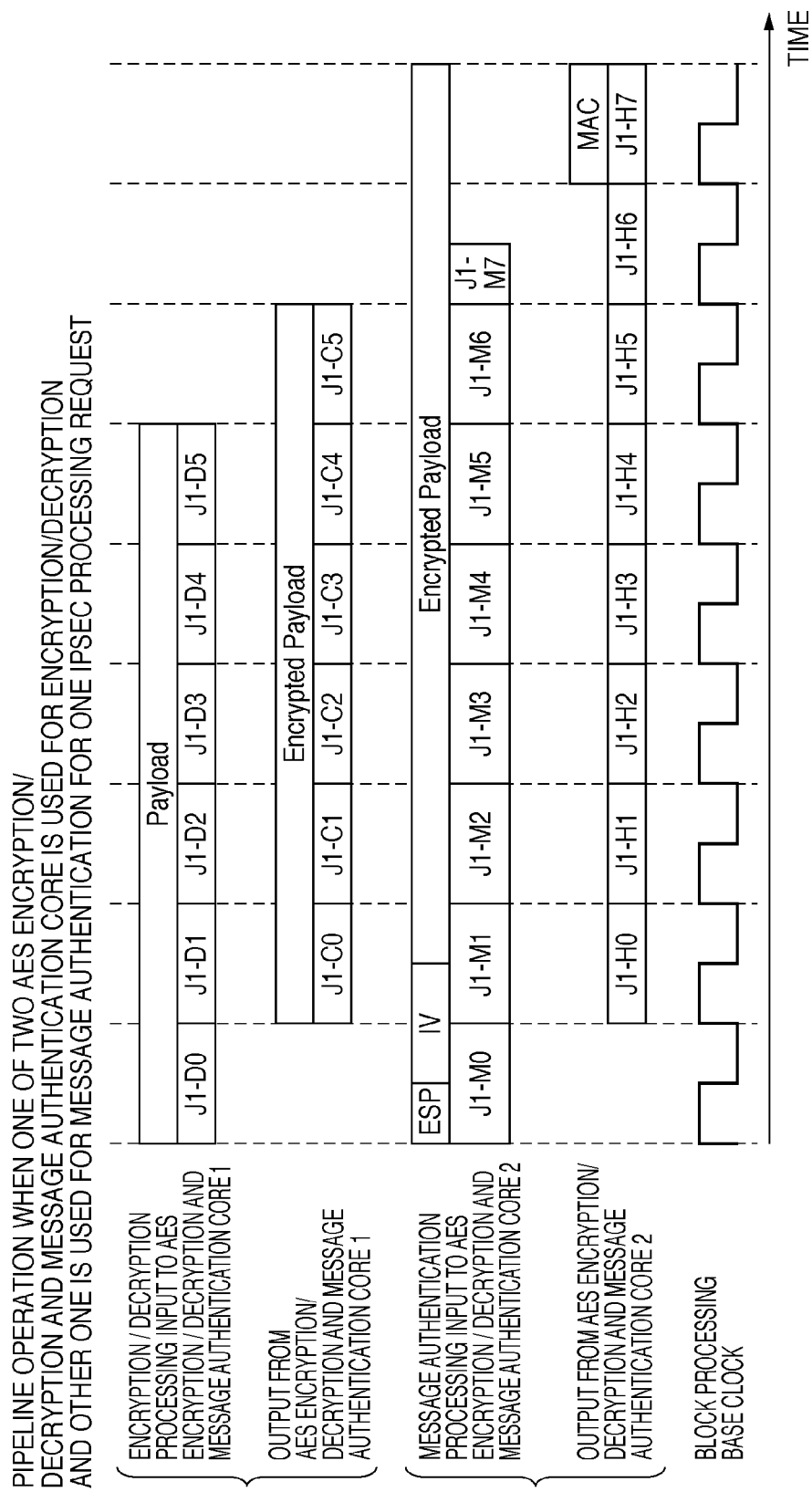
FIG. 3 is a timing chart of a pipeline operation when one AES encryption/decryption and message authentication core is used for message authentication processing and the other one is used for encryption/decryption processing in the first embodiment.

FIG. 3 is a timing chart showing a pipeline operation when one of the encryption/decryption and message authentication cores 107 and 108 is fixedly used for encryption/decryption, and the other one is fixedly used for message authentication for one IPSEC processing request. In the first embodiment, a pipeline operation in this case is defined as the first operation mode. Referring to FIG. 3, reference symbol J1-* denotes data concerning a certain processing request (processing request 1). For example, reference symbol J1-D0 denotes the first block data in encryption target data in processing request 1; and J1-C0, the result (the first block data in the encrypted data) of an encrypt process for the first block data in the encryption target data in processing request 1. Also, reference symbol J1-M0 denotes the first block data in message authentication processing target data in processing request 1; and J1-H0, data on the intermediate result of message authentication processing for the first block data in the message authentication processing target data in processing request 1.

A pipeline operation in the first operation mode, in which the encryption/decryption and message authentication cores 107 and 108 each are fixedly used for one of encryption/decryption and message authentication, will be explained in detail below.

When the main CPU 101 processes one IPSEC processing request, it needs to transfer data for use in the processing request stored in the memory 102 to the data transfer control unit 106. To meet this requirement, the main CPU 101 controls the processing request control unit 401 in the data transfer control unit 106 so as to issue a DMA request to the DMAC_A 104. Note that the main CPU 101 sets "IPSEC (Encryption/decryption Algorithm: AES-CBC, Message Authentication Algorithm: AES-XCBC-MAC-96)" in the processing type holding unit 413 of the processing request control unit 401 by register access (not shown). Similarly, the main CPU 101 sets the payload block length in the processing block length holding unit 414, and sets the normal priority levels in the processing priority level holding unit 415.

The data transfer control unit 106 controls to distribute processing target data so that the encryption/decryption and message authentication core 107 is used for encryption/decryption processing and the encryption/decryption and message authentication core 108 is used for message authentication processing when one processing request arises, as described above. That is, the data transfer control unit 106 controls the AES control unit 201 and an AES control unit 301 so that the encryption/decryption and message authentication core 107 performs encryption/decryption processing and the encryption/decryption and message authentication core 108 performs message authentication processing.

When two processing requests arise concurrently, the data transfer control unit 106 controls to distribute processing target data so that the encryption/decryption and message authentication cores 107 and 108 alternately perform encryption/decryption processing and message authentication processing. Details of this distribution control will be described later.

When one processing request arises, the DMAC_A 104 transfers data for use in the processing request in the memory 102 to the data transfer control unit 106, and the data transfer control unit 106 stores the data in the processing data holding unit A 403. The processing data processing unit A 405 adds an ESP trailer containing the padding bit, the padding length, and the next header to the data held in the processing data holding unit A 403 to form a payload as encryption processing target data. The thus formed payload is output to the encryption/decryption data holding unit A 407 for each 16-byte block length. The data transfer control unit 106 connects the payload data held in the encryption/decryption data holding unit A 407 to the encryption/decryption processing input 211 in the encryption/decryption and message authentication core 107 via the crossbar switch 400.

Also, the data transfer control unit 106 stores the encrypted data, transferred from the encryption/decryption and message authentication core 107, in the output data holding unit 411, and connects the encrypted data to the processing data processing unit A 405 via the crossbar switch 400. The processing data processing unit A 405 forms message authentication processing target data from the ESP header, the IV, and the encrypted data stored in the output data holding unit 411 for each 16-byte block length, and outputs it to the message authentication data holding unit A 409 for each 16-byte block length. The data transfer control unit 106 connects the message authentication processing target data held in the message authentication data holding unit A 409 to the message authentication processing input 312 in the encryption/decryption and message authentication core 108 via the crossbar switch 400.

The encryption/decryption and message authentication core 107 adds the output 214 from the selector 208 and the encryption processing target data as the encryption/decryption processing input 211 by the adder 205 for each 16-byte block. After that, the encryption/decryption and message authentication core 107 performs AES block encryption/decryption arithmetic processing by the AES core 200. An operation of holding the obtained encryption/decryption arithmetic processing result in the encryption/decryption output holding unit 206 is then repeated. Note that the selector 208 selects the initial value of the encryption/decryption 202 for the first block and selects the encryption/decryption output holding unit 206 for the second and succeeding blocks. Also, the selector 210 selects the output 214 from the selector 208 and outputs it to the data transfer control unit 106 as the encryption/decryption and message authentication core output 217.

The encryption/decryption and message authentication core 108 adds an output 315 from a selector 309 and message authentication processing target data as a message authentication processing input 312 by an adder 305 for each 16-byte block. After that, the encryption/decryption and message authentication core 108 performs AES block message authentication arithmetic processing by an AES core 300. An operation of holding the obtained message authentication arithmetic processing result in a message authentication output holding unit 307 is then repeated. Note that the selector 309 selects an initial value of the message authentication 303 for the first block, and selects the message authentication output holding unit 307 for the second and succeeding blocks. Also, a key K2/K3 unit 304 outputs a key K2 or K3 to the adder 305 in accordance with whether the message length is a multiple of the block length for the last block. A selector 310 selects the output 315 from the selector 309 and outputs it to the data transfer control unit 106 as an encryption/decryption and message authentication core 317.

Each counter of the core control unit 402 in the data transfer control unit 106 counts the number of blocks of encryption/decryption processing or message authentication processing in the encryption/decryption and message authentication cores 107 and 108.

As described above, the first embodiment implements a pipeline operation for one IPSEC processing request in encryption/decryption processing and message authentication processing by each of the encryption/decryption and message authentication cores 107 and 108. The first operation mode shown in FIG. 3 reveals that the encryption/decryption and message authentication core 107 performs encryption/decryption processing, and the encryption/decryption and message authentication core 108 performs message authentication processing in parallel.

Pipeline Operation Which Alternately Uses Each Core (Second Operation Mode)

A pipeline operation which fixedly uses each core has been explained above. However, the encryption/decryption processing apparatus according to the first embodiment can also perform a pipeline operation which alternately uses each core. That is, a pipeline operation is implemented for a plurality of (e.g., two) IPSEC processing requests by alternately using the encryption/decryption and message authentication cores 107 and 108 for encryption/decryption processing and message authentication processing.

Figure 4:
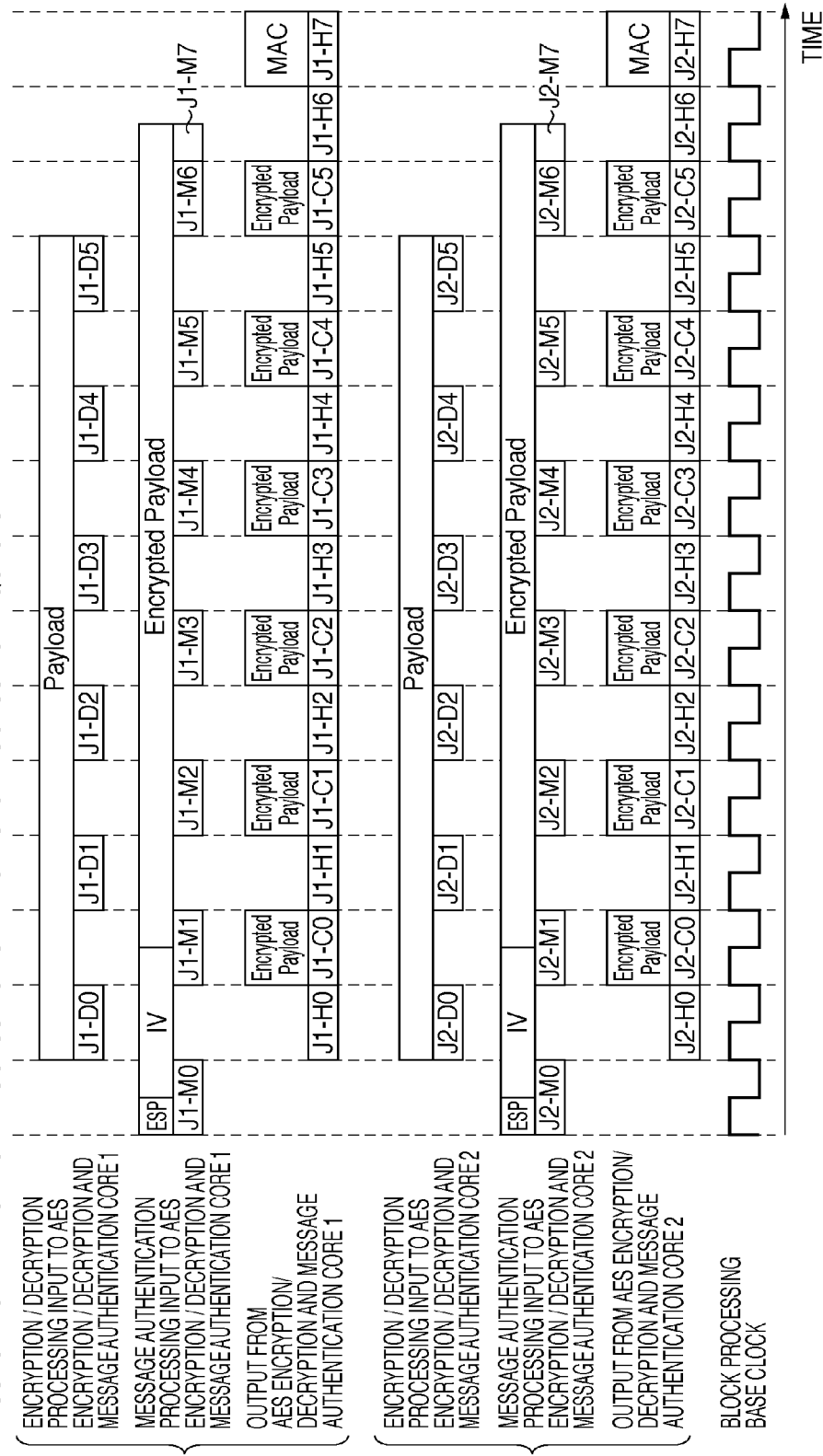
FIG. 4 is a timing chart of a pipeline operation when one AES encryption/decryption and message authentication core is alternately used for message authentication processing and encryption/decryption processing.

FIG. 4 is a timing chart showing a pipeline operation when the encryption/decryption and message authentication cores 107 and 108 are alternately used for encryption/decryption processing and message authentication processing for two IPSEC processing requests (processing requests 1 and 2). In the first embodiment, a pipeline operation in this case is defined as the second operation mode. Referring to FIG. 4, reference symbol J1-* denotes data concerning processing request 1; and J2-*, data concerning processing request 2. Note that data J*-D*, J*-C*, J*-M*, and J*-H* in FIG. 4 are the same as in FIG. 3, and a repetitive description thereof will not be given.

A pipeline operation in the second operation mode, in which one of the encryption/decryption and message authentication cores 107 and 108 is alternately used for encryption/decryption processing and message authentication processing of two IPSEC processing requests, will be explained in detail below.

When the main CPU 101 processes two IPSEC processing requests, it needs to transfer the processing data 501 and 502 for use in processing requests 1 and 2, respectively, stored in the memory 102 to the data transfer control unit 106. To meet this requirement, the main CPU 101 controls the processing request control unit 401 in the data transfer control unit 106 so as to issue DMA requests to the DMAC_A 104 and DMAC_B 105. Note that the main CPU 101 sets "IPSEC (Encryption/decryption Algorithm: AES-CBC, Message Authentication Algorithm: AES-XCBC-MAC-96)" in the processing type holding unit 413 of the processing request control unit 401 for each processing request by register access (not shown). Similarly, the main CPU 101 sets the payload block length in the processing block length holding unit 414, and sets the normal priority levels in the processing priority level holding unit 415.

When two processing requests arise concurrently, the data transfer control unit 106 distributes processing target data and controls the AES control unit 201 so that the encryption/decryption and message authentication core 107 alternately performs encryption/decryption processing and message authentication processing corresponding to processing request 1. The data transfer control unit 106 then distributes processing target data and controls the AES control unit 301 so that the encryption/decryption and message authentication core 108 alternately performs encryption/decryption processing and message authentication processing corresponding to processing request 2.

Processing corresponding to processing request 1 in the encryption/decryption and message authentication core 107 will be explained first.

When the DMAC_A 104 transfers the processing data 500 for use in processing request 1 in the memory 102 to the data transfer control unit 106, the data transfer control unit 106 stores the processing data 500 in the processing data holding unit A 403. The processing data processing unit A 405 adds an ESP trailer containing the padding bit, the padding length, and the next header to the data held in the processing data holding unit A 403 to form a payload as encryption processing target data. The thus formed payload is output to the encryption/decryption data holding unit A 407 for each 16-byte block length. The data transfer control unit 106 connects the payload data held in the encryption/decryption data holding unit A 407 to the encryption/decryption processing input 211 in the encryption/decryption and message authentication core 107 via the crossbar switch 400.

Also, the data transfer control unit 106 stores the encrypted data, transferred from the encryption/decryption and message authentication core 107, in the output data holding unit 411, and connects the encrypted data to the processing data processing unit A 405 via the crossbar switch 400. The processing data processing unit A 405 forms message authentication processing target data from the ESP header, the IV, and the encrypted data stored in the output data holding unit 411 for each 16-byte block length, and outputs it to the message authentication data holding unit A 409 for each 16-byte block length. The data transfer control unit 106 connects the message authentication processing target data held in the message authentication data holding unit A 409 to the message authentication processing input 212 in the encryption/decryption and message authentication core 107 via the crossbar switch 400.

In this way, the encryption/decryption and message authentication core 107 alternately selects and performs message authentication processing and encryption/decryption processing for each base clock according to which a 16-byte block length (a predetermined block unit with the same size) is processed. That is, for example, encryption/decryption processing of one block is performed after message authentication processing of one block. The message authentication processing and encryption/decryption processing will be explained in detail below.

Message authentication processing of one block is performed in the following way first.

The encryption/decryption and message authentication core 107 adds the output 215 from the selector 209 and the message authentication processing target data as the message authentication processing input 212 by the adder 205 for each base clock corresponding to processing of odd-numbered blocks for use in 16-byte message authentication. After that, the encryption/decryption and message authentication core 107 performs AES block message authentication arithmetic processing by the AES core 200. An operation of holding the obtained message authentication arithmetic processing result in the message authentication output holding unit 207 is then repeated. Note that the selector 209 selects the initial value of the message authentication 203 for the first message authentication block, and selects the message authentication output holding unit 207 for the second and succeeding message authentication blocks. Also, the key K2/K3 unit 204 outputs a key K2 or K3 to the adder 205 in accordance with whether the message length is a multiple of the block length for the last message authentication block. Also, the selector 210 selects the output 215 from the selector 209 and outputs it to the data transfer control unit 106 as the encryption/decryption and message authentication core output 217.

After message authentication processing of one block is completed in the foregoing way, encryption/decryption processing of one block is performed next in the following way.

The encryption/decryption and message authentication core 107 adds the output 214 from the selector 208 and the encryption processing target data as the encryption/decryption processing input 211 for each base clock corresponding to processing of even-numbered blocks for use in 16-byte encryption/decryption. After that, the AES core 200 performs AES block encryption/decryption arithmetic processing by the AES core 200. An operation of holding the obtained encryption/decryption arithmetic processing result in the encryption/decryption output holding unit 206 is then repeated. Note that the selector 208 selects the initial value of the encryption/decryption 202 for the first encryption/decryption block, and selects the encryption/decryption output holding unit 206 for the second and succeeding encryption/decryption blocks. Also, the selector 210 selects the output 214 from the selector 208 and outputs it to the data transfer control unit 106 as the encryption/decryption and message authentication core output 217.

From the foregoing description, when the DMAC_A 104 transfers the processing data 500 for use in processing request 1 in the memory 102 to the data transfer control unit 106, the data transfer control unit 106 controls the encryption/decryption and message authentication core 107 so as to alternately perform message authentication and encryption/decryption processing for each block processing base clock.

Processing corresponding to processing request 2 in the encryption/decryption and message authentication core 108 will be explained next.

When the DMAC_B 105 transfers the processing data 501 for use in processing request 2 in the memory 102 to the data transfer control unit 106, the data transfer control unit 106 performs the same control as in the above-mentioned encryption/decryption and message authentication processing corresponding to processing request 1. That is, the data transfer control unit 106 controls the encryption/decryption and message authentication core 108 so as to alternately perform message authentication processing and encryption/decryption processing for each block processing base clock.

As described above, a pipeline operation which alternately uses the encryption/decryption and message authentication cores 107 and 108 for encryption/decryption processing and message authentication processing is implemented for two IPSEC processing requests. The second operation mode shown in FIG. 4 reveals that the encryption/decryption and message authentication core 107 performs encryption/decryption processing and message authentication processing corresponding to processing request 1, and the encryption/decryption and message authentication core 108 performs message authentication processing corresponding to processing request 2 in parallel.

As has been described above, according to the first embodiment, the data transfer control unit 106 controls the two encryption/decryption and message authentication cores 107 and 108 so as to operate in predetermined operation modes in accordance with the circumstance in which processing requests arise. This allows encryption/decryption processing and message authentication processing in parallel to process a plurality of messages without imposing any loads of software control such as suspending and resuming on the encryption/decryption and message authentication cores 107 and 108. Moreover, the encryption/decryption processing and message authentication processing for each block with the same size (for each 16-byte block in this case) allow efficient parallel processing, and therefore improve the overall throughput.

The timing chart shown in FIG. 4 exemplifies a case in which the two encryption/decryption and message authentication cores 107 and 108 alternately perform message authentication processing and encryption/decryption processing for two processing requests from the beginning. However, the present invention does not always alternately perform message authentication processing and encryption/decryption processing for two processing requests in this way. In another example, first, the first mode shown in FIG. 3, i.e., the state in which the two encryption/decryption and message authentication cores separately perform message authentication processing and encryption/decryption processing is set for the first processing request. In this state, as the second processing request arises, dynamic switching to the second operation mode shown in FIG. 4, i.e., the state in which each encryption/decryption and message authentication core alternately performs message authentication processing and encryption/decryption processing can be done.

Also, although IPSEC in IPv4 transport mode, as shown in FIG. 2, has been explained above as an example, the form of IPSEC is not limited to this. The present invention is also applicable to IPv6 transport mode or a tunnel mode.

In addition, although an arrangement including two DMACs and two encryption/decryption and message authentication cores has been explained above, the numbers of DMACs and encryption/decryption and message authentication cores are not limited to two each. That is, according to the present invention, it is possible to perform parallel processing in the second operation mode, as shown in FIG. 4, for processing requests whose number is equal to that of encryption/decryption and message authentication cores. Alternatively, when the apparatus includes, for example, even-numbered encryption/decryption and message authentication cores, it can handle a plurality of processing requests as a whole by coupling two of them to one pair and executing the first operation mode so that each pair handles one processing request.

Furthermore, an arrangement for operating the apparatus by switching between AES-CBC encryption/decryption processing and AES-XCBC-MAC-96 message authentication processing is not limited to the encryption/decryption and message authentication cores 107 and 108 shown in FIGS. 1A and 1B, and can be changed into various forms.

<Second Embodiment>

In the second embodiment, IPSEC ESP protocol processing which uses an AES encryption/decryption core dedicated to encryption/decryption processing and an AES message authentication core dedicated to message authentication processing will be explained in the second embodiment. Like the first embodiment, encryption/decryption and message authentication processing is performed using AES-CBC and AES-XCBC-MAC-96 as an encryption/decryption algorithm and a message authentication algorithm, respectively.

Apparatus Arrangement

An encryption/decryption processing apparatus 100 has the same arrangement as in the first embodiment, and a repetitive description thereof will not be given. The packet format used is also the same as in the first embodiment. The difference from the first embodiment lies in the use of an AES encryption/decryption core dedicated to encryption/decryption processing and an AES message authentication core dedicated to message authentication processing.

Figure 5:
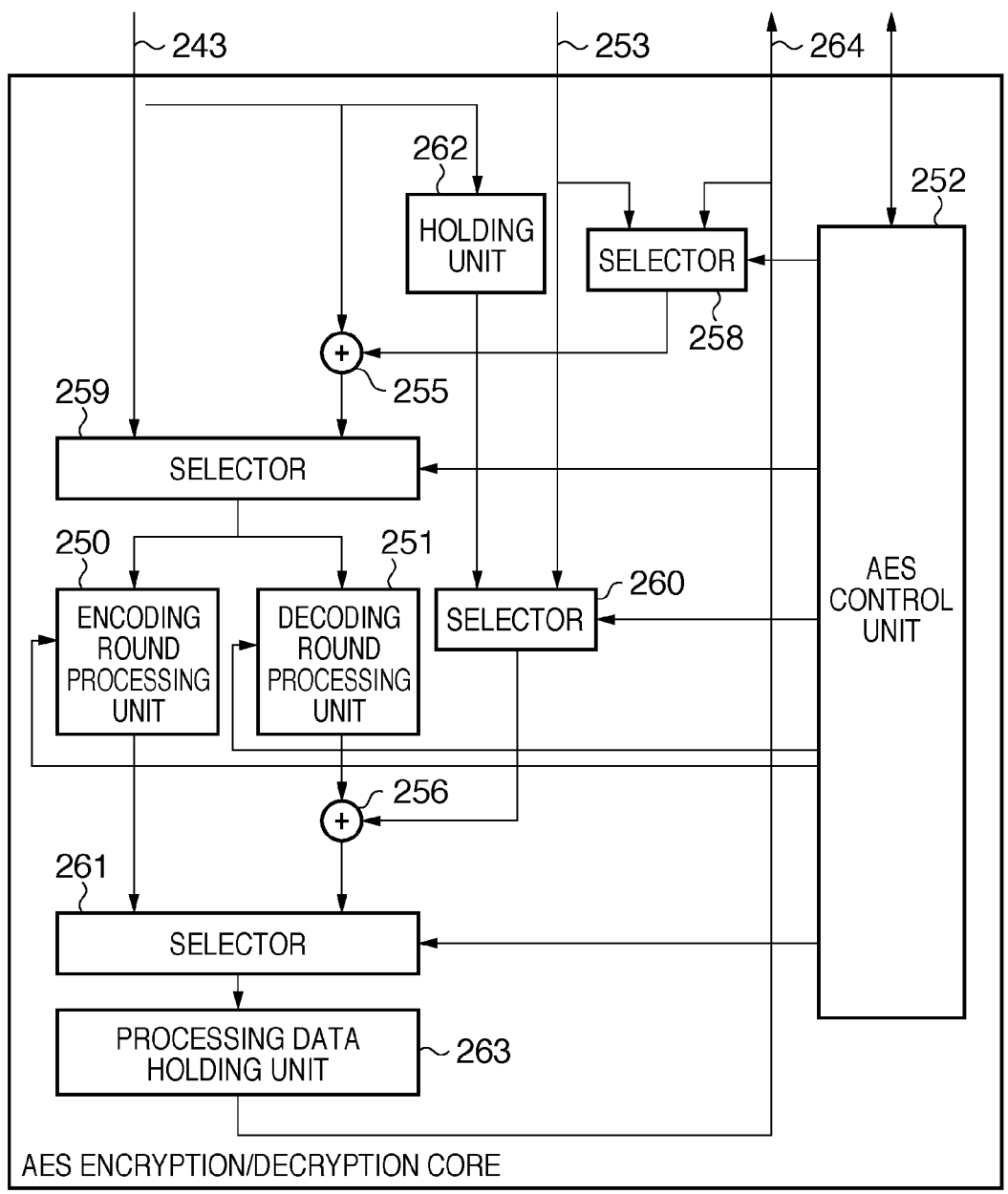
FIG. 5 is a block diagram showing the arrangement of an AES encryption/decryption core in the second embodiment.

FIG. 5 is a block diagram showing the arrangement of an AES encryption/decryption core having an AES-CBC encryption/decryption processing function in the second embodiment.

Reference numeral 250 denotes an encoding round processing unit which performs processing of one round per clock cycle in an encrypt process. The encoding round processing unit 250 includes a holding unit for temporarily holding the processing result of each round. Reference numeral 251 denotes a decoding round processing unit which performs processing of one round per clock cycle in a decrypt process. The decoding round processing unit 251 includes a holding unit for temporarily holding the processing result of each round. Reference numeral 252 denotes an AES control unit which systematically controls the AES encryption/decryption core. Reference numeral 253 denotes the AES-CBC initial vector (IV). Reference numerals 255 and 256 denote adders for exclusive OR processing.

Reference numeral 258 denotes a selector for switching between the data output from a processing data holding unit 263 and the initial vector 253. Reference numeral 259 denotes a selector for switching between encryption/decryption processing input data 243 and the data output from the adder 255. Reference numeral 260 denotes a selector for switching between the AES encryption/decryption core input data in the immediately preceding block held in a holding unit 262, and the initial vector 253. Reference numeral 261 denotes a selector for switching between the data output from the encoding round processing unit 250 and that output from the adder 256. Reference numeral 262 denotes the holding unit for temporarily holding the AES encryption/decryption core input data in the immediately preceding block. Reference numeral 263 denotes the processing data holding unit for holding encryption/decryption output data from the AES encryption/decryption core. Reference numeral 264 denotes the data output from the AES encryption/decryption core, which is temporarily held in the processing data holding unit 263.

Figure 6:
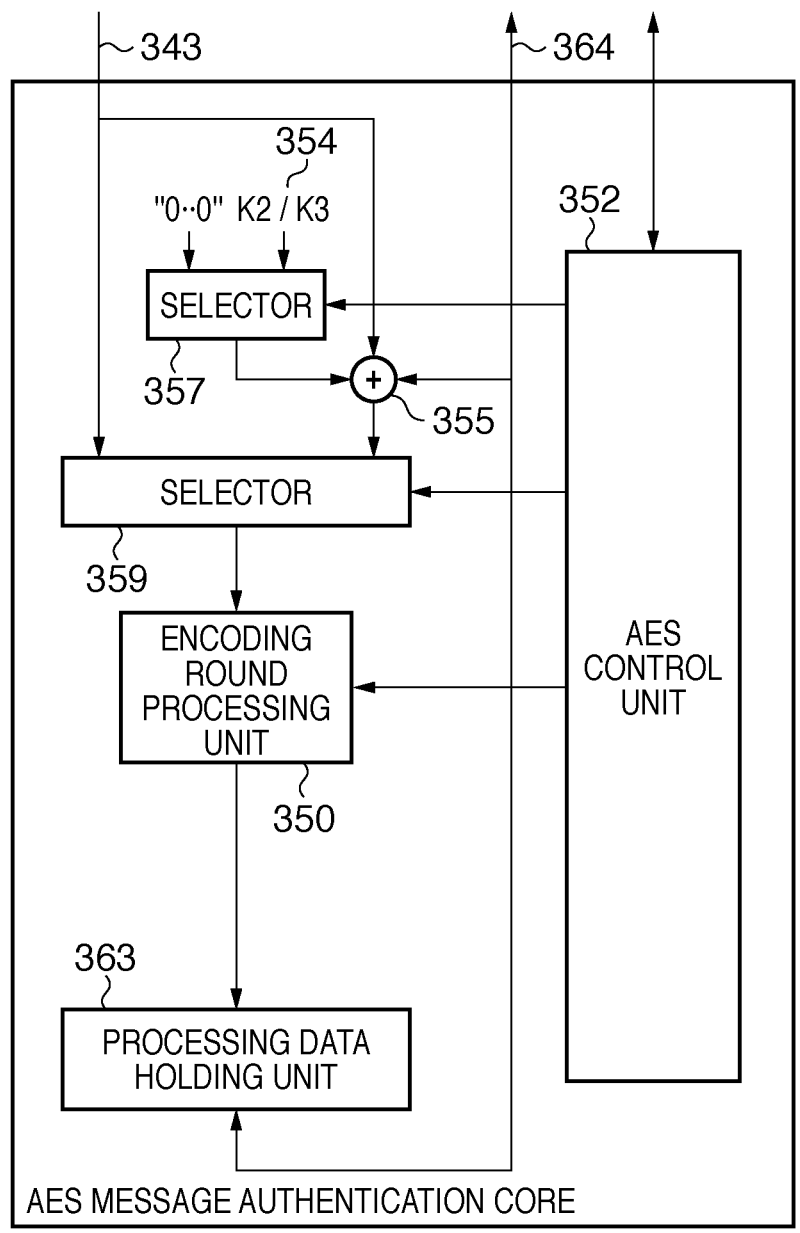
FIG. 6 is a block diagram showing the arrangement of an AES message authentication core in the second embodiment.

FIG. 6 is a block diagram showing the arrangement of an AES message authentication core having an AES-XCBC-MAC-96 processing function in the second embodiment.

Reference numeral 350 denotes an encoding round processing unit which performs processing of one round per clock cycle. The encoding round processing unit 350 includes a holding unit for temporarily holding the processing result of each round. Reference numeral 352 denotes an AES control unit which systematically controls the AES encryption/decryption core. Reference numeral 354 denotes a key K2/K3 selected in accordance with whether the message length is a multiple of the block length in processing of the last block of AES-XCBC-MAC-96. Reference numeral 355 denotes an adder for exclusive OR processing. Reference numeral 357 denotes a selector for selecting the key K2/K3 used for processing of the last block and "000 . . . 000" used for processing of other blocks; and 359, a selector for switching between message authentication processing input data 343 and the data output from the adder 355. Reference numeral 363 denotes a processing data holding unit for holding the encryption/decryption output data from the AES encryption/decryption core. Reference numeral 364 denotes AES message authentication output data temporarily held in the processing data holding unit 363.

Pipeline Operation Which Fixedly Uses Each Core (First Operation Mode)

A pipeline operation can be implemented for one IPSEC processing request (processing request 1) by performing encryption/decryption processing by the encryption/decryption core, and performing message authentication processing by the message authentication core for each block in the same way as in that described in the first embodiment. Other operations of the encryption/decryption processing apparatus 100 are the same as in the first embodiment.

Figure 7:
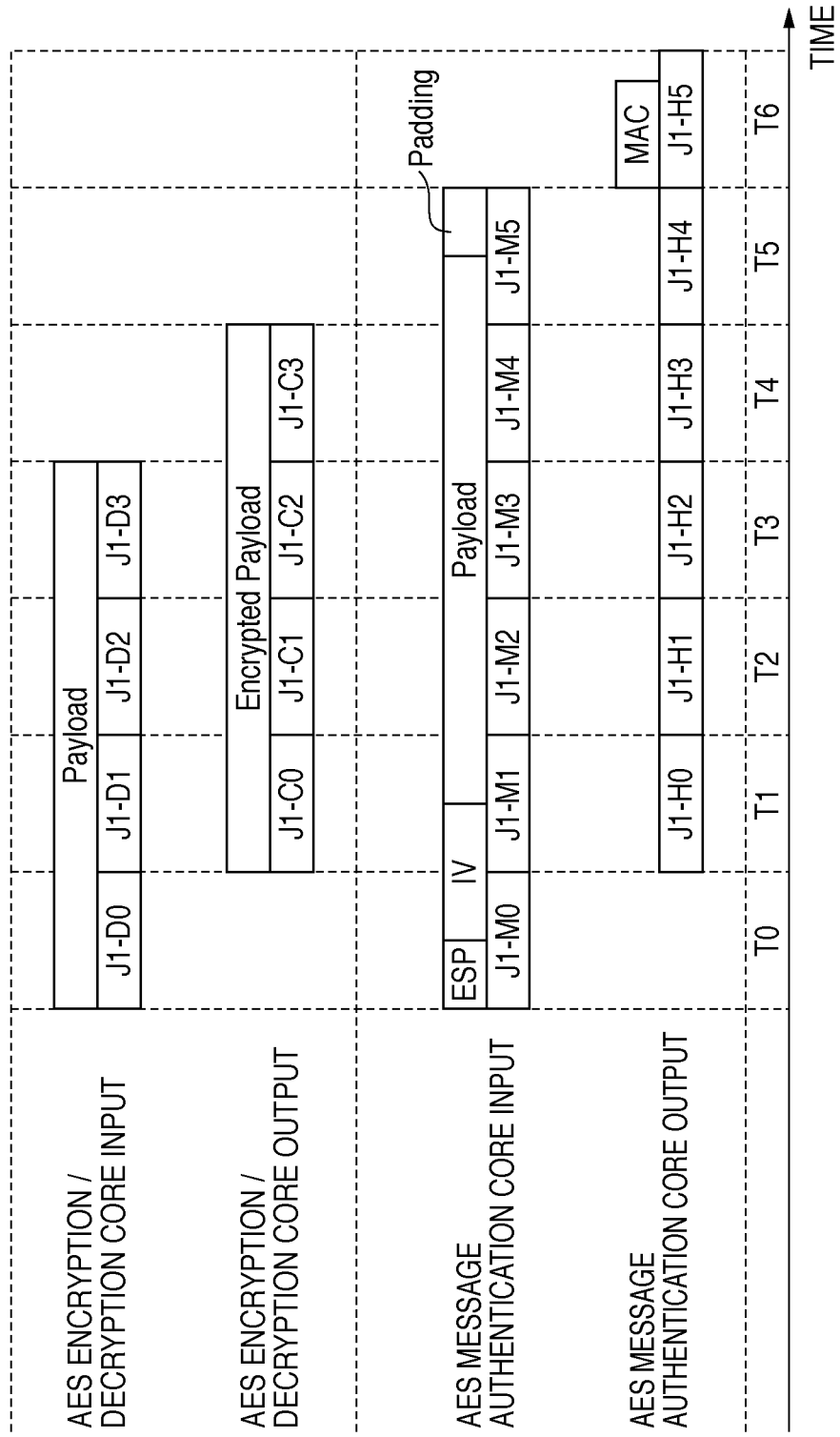
FIG. 7 is a timing chart of an operation when the AES encryption/decryption core performs cipher encoding processing and the AES message authentication core performs message authentication processing for one processing request.

FIG. 7 is a timing chart of a pipeline operation by the AES encryption/decryption core and the AES message authentication core for one IPSEC processing request.

Like the first embodiment, referring to FIG. 7, reference symbol J1-* denotes data concerning processing request 1. For example, reference symbol J1-D0 denotes the first block data in encryption target data (Payload) in processing request 1; and J1-C0, the result (the first block data in the encrypted data) of an encrypt process for the first block data in the encryption target data in processing request 1. Also, reference symbol J1-M0 denotes the first block data in message authentication processing target data in processing request 1; and J1-H0, data on the intermediate result of message authentication processing for the first block data in the message authentication processing target data in processing request 1.

Cipher Encoding Processing in AES Encryption/Decryption Core

Referring to FIG. 7, the first block data J1-D0 undergoes encryption processing in a duration T0. The selector 258 receives the initial vector 253 and the output data 264 from the processing data holding unit 263. The selector 258 selects the initial vector 253 under the control of the AES control unit 252, and uses it as its output data. The adder 255 adds the data output from the selector 258 and the encryption/decryption processing input data 243, and inputs the sum to the selector 259. The selector 259 selects the data output from the adder 255, of the encryption/decryption processing input data 243 and the data output from the adder 255, under the control of the AES control unit 252, and the encoding round processing unit 250 performs round processing.

Processing of all rounds is performed for one block per clock cycle in the first embodiment, whereas processing of one round is performed per clock cycle in the second embodiment. The processing result of each round per clock cycle is held in the holding unit built in the encoding round processing unit 250, and undergoes processing of a predetermined number of rounds by the encoding round processing unit 250. The data output from the selector 259 is also input to the decoding round processing unit 251, and similarly undergoes processing of one round per clock cycle by the decoding round processing unit 251.

The processing result of each round per clock cycle is held in the holding unit built in the decoding round processing unit 251, and undergoes processing of a predetermined number of rounds by the decoding round processing unit 251. The adder 256 adds the data output from the decoding round processing unit 251 and that output from the selector 260, and inputs the sum to the selector 261, together with the data output from the encoding round processing unit 250. The selector 261 selects the data output from the encoding round processing unit 250 as the output data 264 under the control of the AES control unit 252.

In this way, the first block data J1-D0 undergoes encryption processing, and the processing data holding unit 263 receives the encryption processing result J1-C0 corresponding to the first block data J1-D0.

Next, in a duration T1, the processing data holding unit 263 continues holding the encryption processing result J1-C0, and second block data J1-D1 undergoes encryption processing. The selector 258 receives the initial vector 253 and the output data 264 from the processing data holding unit 263. The selector 258 selects the output data 264 from the processing data holding unit 263 under the control of the AES control unit 252, and uses it as its output data. The adder 255 adds the data output from the selector 258 and the encryption/decryption processing input data 243, and inputs the sum to the selector 259. Subsequently, the second block data J1-D1 undergoes the same processing as in the first block data, and the processing data holding unit 263 receives an encryption processing result J1-C1 corresponding to the second block data J1-D1.

Subsequently, third block data J1-D2 and fourth block data J1-D3 undergo the same processing as above, and encryption processing results J1-C2 and J1-C3 corresponding to these data are obtained.

Message Authentication Processing in AES Message Authentication Core

Referring to FIG. 7, the first block data J1-M0 undergoes message authentication processing in the duration T0. The selector 357 receives key data K2/K3 and data "000 . . . 000" which has all bit values of '0' and whose number of bits is equal to the key length. The selector 357 selects the data "000 . . . 000" under the control of the AES control unit 352, and uses it as its output data. The adder 355 adds the data output from the selector 357, the message authentication processing input data 343, and the AES message authentication output data 364, and inputs the sum to the selector 359. Note that the output data 364 has all bit values initialized to '0'.

The selector 359 selects the message authentication processing input data 343, of the message authentication processing input data 343 and the output from the adder 355, under the control of the AES control unit 352, and the encoding round processing unit 350 performs round processing. Processing of all rounds is performed for one block per clock cycle in the first embodiment, whereas processing of one round is performed per clock cycle in the second embodiment. The processing result of each round per clock cycle is held in the holding unit built in the encoding round processing unit 350, and undergoes processing of a predetermined number of rounds by the encoding round processing unit 350.

In this way, the first block data J1-M0 undergoes message authentication processing, and the processing data holding unit 363 receives the message authentication processing result J1-H0 corresponding to the first block data J1-M0.

Next, in the duration T1, the processing data holding unit 363 continues holding the message authentication processing result J1-H0, and second block data J1-M1 undergoes message authentication processing. The second block data undergoes the same processing as in the first block data, and the processing data holding unit 363 receives a message authentication processing result J1-H1 corresponding to the second block data J1-M1.

Subsequently, the same processing is sequentially repeated for the third and succeeding block data in durations T2 to T4. In a duration T5, the selector 357 receives key data K2/K3 and data "000 . . . 000" which has all bit values of '0' and whose number of bits is equal to the key length for last block data J1-M5. The selector 357 selects the key data K2/K3 under the control of the AES control unit 352, and uses it as its output data.

The key data K2/K3 is selected in accordance with whether the length of the payload data is an integer multiple of the block length. The adder 355 adds the data output from the selector 357, the message authentication processing input data 343, and the AES message authentication output data 364, and inputs the sum to the selector 359. Subsequent processing is the same as in processing of blocks other than the last block.

In a duration T6, a message authentication processing result J1-H5 for the last block is output as the data output from the AES message authentication core. However, only 96 bits of the message authentication processing result J1-H5 are used as the processing result of AES-XCBC-MAC-96, and the message authentication processing result J1-H0 to a message authentication processing result J1-H4 are not directly used.

Figure 8:
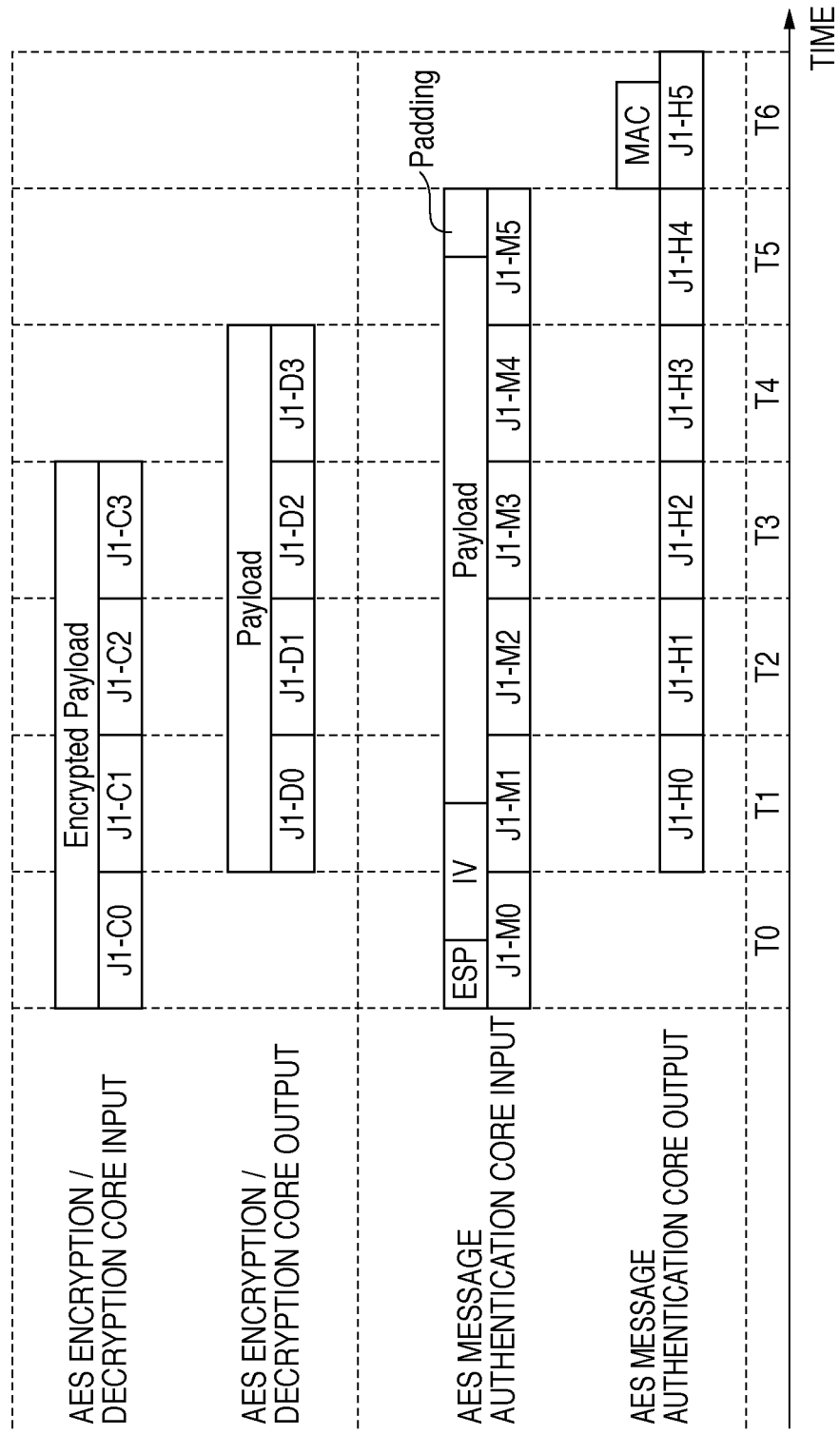
FIG. 8 is a timing chart of an operation when the AES encryption/decryption core performs cipher decoding processing and the AES message authentication core performs message authentication processing for one processing request.

A message authentication processing operation in the AES message authentication core shown in FIG. 8 is the same as in the case shown in FIG. 7.

Cipher Decoding Processing in AES Encryption/Decryption Core

Referring to FIG. 8, the first block data J1-C0 undergoes decryption processing in a duration T0. The selector 258 receives the initial vector 253 and the output data 264 from the processing data holding unit 263. The selector 258 selects the initial vector 253 under the control of the AES control unit 252, and uses it as its output data. The adder 255 adds the data output from the selector 258 and the encryption/decryption processing input data 243, and inputs the sum to the selector 259. The selector 259 selects the encryption/decryption processing input data 243, of the encryption/decryption processing input data 243 and the data output from the adder 255, under the control of the AES control unit 252, and the encoding round processing unit 250 performs round processing. The processing result of each round per clock cycle is held in the holding unit built in the encoding round processing unit 250, and undergoes processing of a predetermined number of rounds by the encoding round processing unit 250.

The data output from the selector 259 is also input to the decoding round processing unit 251, and similarly undergoes processing of one round per clock cycle by the decoding round processing unit 251. The processing result of each round per clock cycle is held in the holding unit built in the decoding round processing unit 251, and undergoes processing of a predetermined number of rounds by the decoding round processing unit 251. The selector 260 receives the initial vector 253 and the block data in the immediately preceding block held in the holding unit 262, and selects the initial vector 253 under the control of the AES control unit 252. The adder 256 adds the data output from the decoding round processing unit 251 and that output from the selector 260, and inputs the sum to the selector 261, together with the data output from the encoding round processing unit 250. The selector 261 selects the data output from the adder 256 as the output data 264 under the control of the AES control unit 252.

In this way, the first block data J1-C0 undergoes decryption processing, and the processing data holding unit 263 receives the decryption processing result J1-D0 corresponding to the first block data J1-C0.

Next, in a duration T1, the processing data holding unit 263 continues holding the decryption processing result J1-D0, and the second block data J1-C1 undergoes decryption processing. The selector 258 receives the initial vector 253 and the output data 264 from the processing data holding unit 263. The selector 258 selects the output data 264 from the processing data holding unit 263 under the control of the AES control unit 252, and uses it as its output data. The adder 255 adds the data output from the selector 258 and the encryption/decryption processing input data 243, and inputs the sum to the selector 259. The selector 259 selects the encryption/decryption processing input data 243, of the encryption/decryption processing input data 243 and the data output from the adder 255, under the control of the AES control unit 252, and the encoding round processing unit 250 performs round processing. The processing result of each round per clock cycle is held in the holding unit built in the encoding round processing unit 250, and undergoes processing of a predetermined number of rounds by the encoding round processing unit 250.

The data output from the selector 259 is also input to the decoding round processing unit 251, and similarly undergoes processing of one round per clock cycle by the decoding round processing unit 251. The processing result of each round per clock cycle is held in the holding unit built in the decoding round processing unit 251, and undergoes processing of a predetermined number of rounds by the decoding round processing unit 251. The selector 260 receives the initial vector 253 and the block data in the immediately preceding block held in the holding unit 262, and selects, under the control of the AES control unit 252, the block data in the immediately preceding block held in the holding unit 262. The adder 256 adds the data output from the decoding round processing unit 251 and that output from the selector 260, and inputs the sum to the selector 261, together with the data output from the encoding round processing unit 250. The selector 261 selects the data output from the adder 256 as the output data 264 under the control of the AES control unit 252.

In this way, the second block data J1-C1 undergoes decryption processing, and the processing data holding unit 263 receives the decryption processing result J1-D1 corresponding to the second block data J1-C1. Subsequently, the third block data J1-C2 and fourth block data J1-C3 undergo the same processing as above, and the decryption processing results J1-D2 and J1-D3 corresponding to these data are obtained.

Pipeline Operation Which Alternately Uses Each Core (Second Operation Mode)

A pipeline operation can be implemented for two IPSEC processing requests (processing requests 1 and 2) by alternately performing encryption/decryption processing by the encryption/decryption core, and performing authentication processing by the message authentication core for each block.

Figure 9:
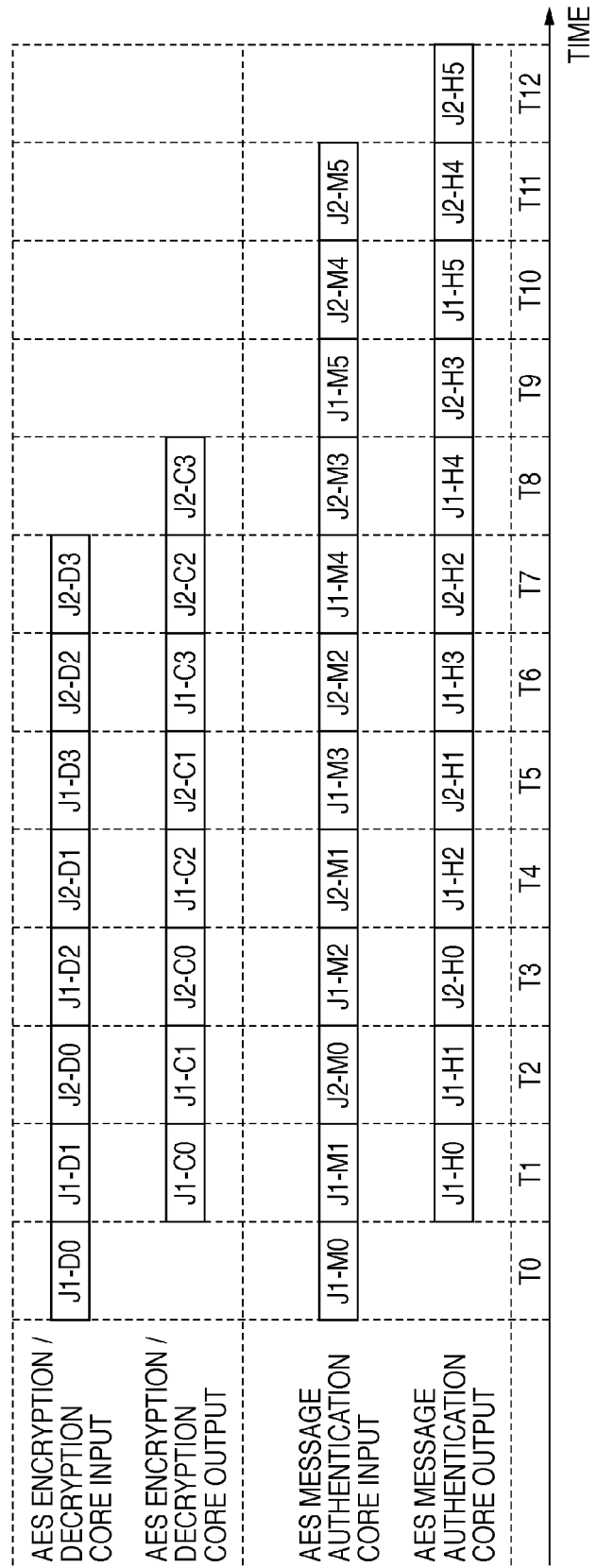
FIG. 9 is a timing chart of an operation when the AES encryption/decryption core performs encoding processing and the AES message authentication core performs message authentication processing for two processing requests.

FIG. 9 is a timing chart illustrating an example of a pipeline operation by the AES encryption/decryption core and the AES message authentication core for two IPSEC processing requests (processing requests 1 and 2).

Referring to FIG. 9, reference symbol J1-* denotes data concerning processing request 1; and J2-*, data concerning processing request 2. For example, reference symbols J1-D0 and J2-D0 respectively denote the first block data in encryption target data (Payload) in processing request 1. Also, reference symbols J1-C0 and J2-C1 denote the results (the first block data in the encrypted data) of an encrypt process for the first block data in the encryption target data in processing requests 1 and 2, respectively. Also, reference symbols J1-M0 and J2-M0 denote the first block data in the message authentication processing target data in processing requests 1 and 2, respectively; and J1-H0 and J2-H0, data on the intermediate results of message authentication processing for the first block data in the message authentication processing target data in processing requests 1 and 2, respectively.

The foregoing description assumes that both processing requests 1 and 2 designate a payload length of four blocks, and processing request 2 arises during processing of two blocks in processing request 1, so processing involved is alternately performed for these two processing requests until processing request 2 solely remains after the end of processing for processing request 1, and processing involved is performed for only processing request 2 after the end of processing of processing request 1. Note that an encryption/decryption processing operation for each block from the first block to the last block in the AES encryption/decryption core is the same as in the first operation mode, and a repetitive description thereof will not be given.

As shown in FIG. 9, a block processed in the AES encryption/decryption core, and the data output from the AES encryption/decryption core have the following relationship. In a duration T0, the AES encryption/decryption core receives the first block data J1-D0 in processing request 1, and performs cipher encoding processing for this data. In a duration T1, the AES encryption/decryption core receives the second block data J1-D1 in processing request 1, and performs cipher encoding processing for this data. Also, in the duration T1, the encryption processing result J1-C0 for the block J1-D0 encoded in the duration T0 is output in parallel. In a duration T2, the AES encryption/decryption core receives the first block data J2-D0 in processing request 2, and performs cipher encoding processing for this data. Also, in the duration T2, the encryption processing result J1-C1 for the block J1-D1 encoded in the duration T0 is output in parallel. Similarly, in a duration T8, an encryption processing result J2-C3 for a block J2-D3 encoded in a duration T7 is output.

Also, as shown in FIG. 9, a block processed in the AES message authentication core, and the data output from the AES message authentication core have the following relationship. In the duration T0, the AES message authentication core receives the first block data J1-M0 in processing request 1, and performs message authentication processing for this data. In the duration T1, the AES message authentication core receives the second block data J1-M1 in processing request 1, and performs message authentication processing for this data. Also, in the duration T1, the message authentication processing result J1-H0 for the block J1-M0 whose message is authenticated in the duration T0 is output in parallel. In the duration T2, the AES message authentication core receives the first block data J2-M0 in processing request 2, and performs message authentication processing for this data. Also, in the duration T2, the message authentication processing result J1-H1 for the block J1-M1 whose message is authenticated in the duration T1 is output in parallel. Similarly, a message authentication processing result J2-H5 for a block J2-M5 whose message is authenticated in a duration T11 is output.

In this manner, a pipeline operation can be efficiently implemented for two IPSEC processing requests (processing requests 1 and 2) using the AES encryption/decryption core and the AES message authentication core.

As has been described above, according to the second embodiment, an AES encryption/decryption core which performs AES-CBC processing and an AES message authentication core which performs AES-XCBC-MAC-96 processing are independently provided. This allows encryption/decryption processing and message authentication processing in parallel without software control such as suspending and resuming for the AES encryption/decryption core and the AES message authentication core even when a plurality of processing requests arise. This, in turn, makes it possible to improve the processing performance free from any additional overheads of software processing. It is also possible to reduce the circuit scale as compared with that in the first embodiment by providing a dedicated AES encryption/decryption core and AES message authentication core which exclusively perform encryption/decryption processing and message authentication processing, respectively.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-302907, filed Nov. 27, 2008, and No. 2009-212520, filed Sep. 14, 2009, which are hereby incorporated by reference herein in their entirety.

What is claimed is:

1. An information processing apparatus comprising:
a plurality of encryption/decryption and message authentication units which are configured to perform encryption/decryption processing and message authentication processing by switching therebetween in a predetermined block unit, and to be operable in parallel;
a data transfer control unit which distributes processing target data associated with an encryption/decryption and message authentication processing request to said plurality of encryption/decryption and message authentication units; and
a switching unit which switches an operation mode of said data transfer control unit in accordance with a circumstance in which the processing request arises,
wherein said data transfer control unit has two modes:
a first operation mode in which said data transfer control unit distributes the processing target data so that one of said plurality of encryption/decryption and message authentication units performs the encryption/decryption processing and at least one of the remainder of said plurality of encryption/decryption and message authentication units performs the message authentication processing, and
a second operation mode in which said data transfer control unit distributes the processing target data so that each of said plurality of encryption/decryption and message authentication units exclusively performs the encryption/decryption processing and the message authentication processing in the predetermined block unit, and
wherein said switching unit selects the first operation mode when one processing request arises, and selects the second operation mode when a plurality of processing requests arise.

2. The apparatus according to claim 1, wherein said plurality of encryption/decryption and message authentication units perform the encryption/decryption processing and the message authentication processing for each block with the same size.

3. The apparatus according to claim 1, wherein said data transfer control unit distributes the processing target data to said plurality of encryption/decryption and message authentication units using a crossbar switch.

4. The apparatus according to claim 1, wherein said encryption/decryption processing is AES-CBC encryption/decryption processing, and said message authentication processing is AES-XCBC-MAC-96 message authentication processing.

5. The apparatus according to claim 1, wherein said second operation mode in which said data transfer control unit distributes the processing target data so that each of said plurality of encryption/decryption and message authentication units alternately performs the encryption/decryption processing and the message authentication processing in the predetermined block unit.

* * * * *